(12) United States Patent
Kim et al.

(10) Patent No.: US 8,311,516 B2
(45) Date of Patent: Nov. 13, 2012

(54) SYSTEM FOR MAINTAINING THE BROADCASTING INFORMATION IN USIM UNLOCK ENVIRONMENT AND METHOD THEREOF

(75) Inventors: Jong Ho Kim, Seoul (KR); Kwang Young Kim, Seoul (KR); Chang Il Kim, Seoul (KR); Byung Seok Hwang, Gunpo-si (KR); Min Seok Kim, Seoul (KR)

(73) Assignee: SK Planet Co., Ltd, Seoul (KR)

( * ) Notice: Subject to any disclaimer, the term of this patent is extended or adjusted under 35 U.S.C. 154(b) by 224 days.

(21) Appl. No.: 12/678,050

(22) PCT Filed: Jan. 15, 2008

(86) PCT No.: PCT/KR2008/000249
§ 371 (c)(1),
(2), (4) Date: Mar. 12, 2010

(87) PCT Pub. No.: WO2009/038253
PCT Pub. Date: Mar. 26, 2009

(65) Prior Publication Data
US 2010/0227590 A1     Sep. 9, 2010

(30) Foreign Application Priority Data
Sep. 21, 2007 (KR) .................. 10-2007-0096622

(51) Int. Cl.
*H04M 3/00* (2006.01)
*H04B 1/38* (2006.01)
*H04L 29/06* (2006.01)
*H04N 11/00* (2006.01)
*H04N 7/167* (2006.01)

(52) U.S. Cl. ........ 455/411; 455/418; 455/419; 455/558; 713/155; 713/158; 713/160; 713/161; 348/552; 380/210; 380/211; 380/228; 380/229; 380/239; 725/25; 725/28; 725/31; 725/100

(58) Field of Classification Search .................. None
See application file for complete search history.

(56) References Cited

U.S. PATENT DOCUMENTS
7,043,020 B2    5/2006 Maillard et al.
(Continued)

FOREIGN PATENT DOCUMENTS
EP    1775948    4/2007
(Continued)

OTHER PUBLICATIONS
International Search Report for PCT application No. PCT/KR2008/000249, Published Mar. 2009.
(Continued)

*Primary Examiner* — Dwayne Bost
*Assistant Examiner* — Nalini Yerneni
(74) *Attorney, Agent, or Firm* — Lowe Hauptman Ham & Berner, LLP

(57) ABSTRACT

Disclosed is a system and a method for maintaining broadcasting chip information regardless of device replacement in a USIM unlock environment where broadcast information can be automatically modified in response to device replacement. The method includes: transmitting terminal information on the second terminal and subscriber information corresponding to the first USIM card to a mobile communication information management server; when the terminal information is different from terminal information corresponding to the subscriber information, determining that there has been device replacement, and then providing the terminal information and the subscriber information to a broadcast information management server, by the mobile communication information management server; transmitting a request for modification of broadcasting chip information from the mobile communication information management server to a Conditional Access System (CAS), and extracting, by the CAS, broadcast information on the first broadcasting chip based on the subscriber information in response to the request; generating EMM information based on the broadcast information on the first broadcasting chip, and providing the generated EMM information to the second terminal corresponding to the terminal information; and modifying the information on the second broadcasting chip of the second terminal to information of the first broadcasting chip.

4 Claims, 3 Drawing Sheets

U.S. PATENT DOCUMENTS

| | | | |
|---|---|---|---|
| 7,680,275 B1 * | 3/2010 | Balestri et al. | 380/201 |
| 2004/0166839 A1 * | 8/2004 | Okkonen et al. | 455/419 |
| 2008/0177998 A1 * | 7/2008 | Apsangi et al. | 713/155 |

FOREIGN PATENT DOCUMENTS

| | | | |
|---|---|---|---|
| KR | 10-2006-0001440 A1 * | 1/2006 |
| WO | WO 2006043766 A1 * | 4/2006 |
| WO | WO 2008111819 A1 * | 9/2008 |

OTHER PUBLICATIONS

Yang et al.; "The conditional access flow using subscriber smart card with Koreasat DBS receiver"; IEEE Transactions on Consumer Electronics; Aug. 1997; vol. 43; Issue 3; pp. 330-336.

* cited by examiner

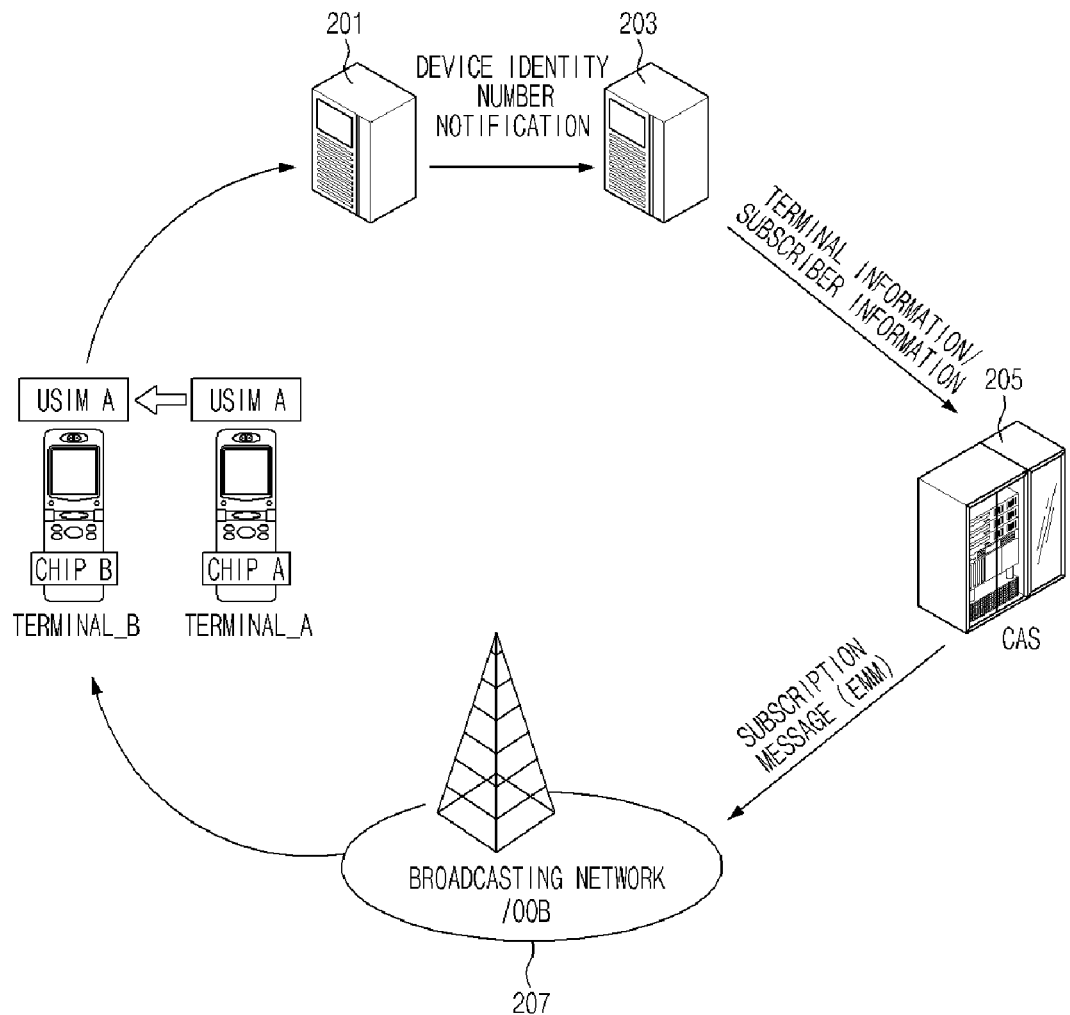
Fig. 2
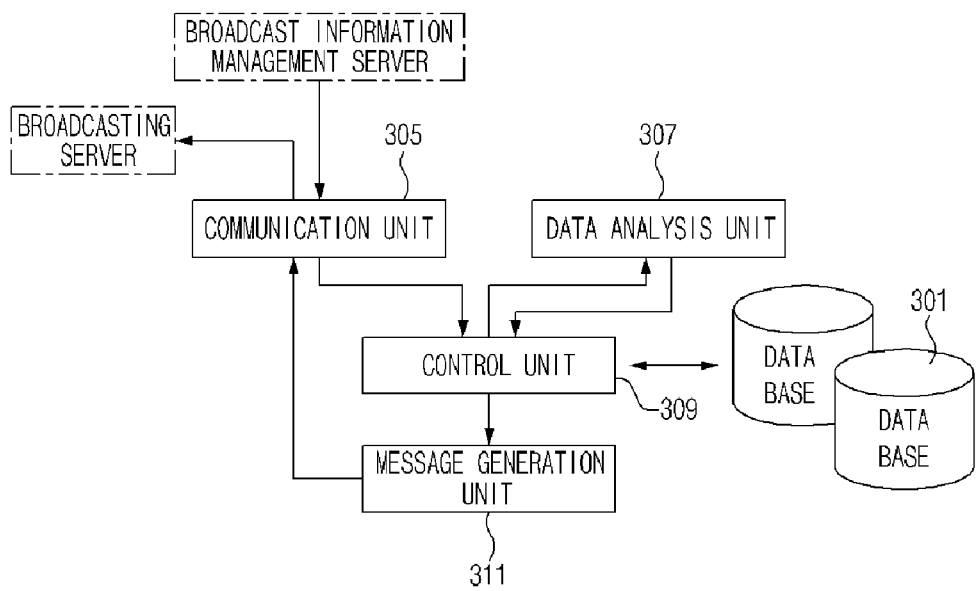
[Fig. 3]

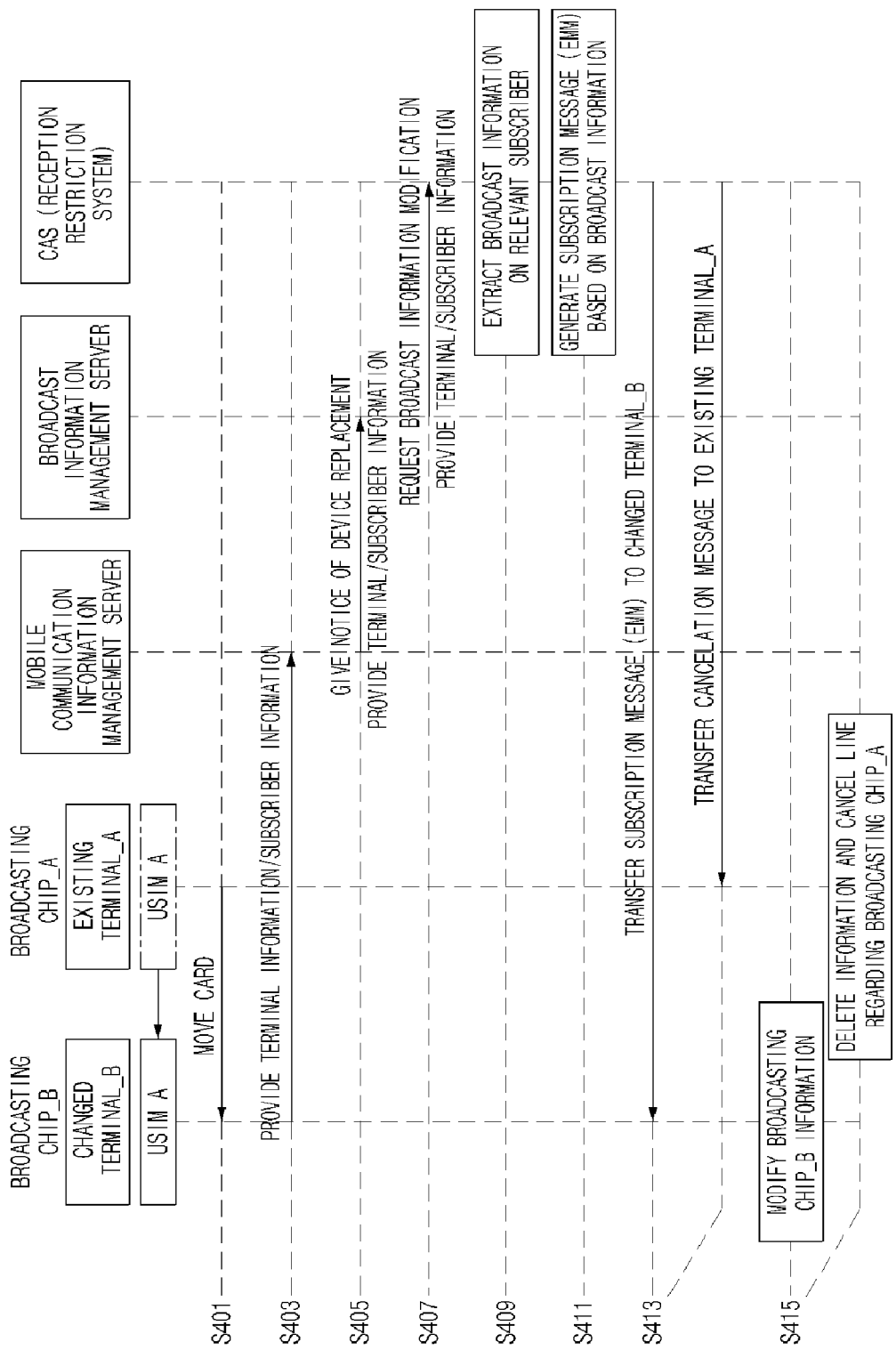

SYSTEM FOR MAINTAINING THE BROADCASTING INFORMATION IN USIM UNLOCK ENVIRONMENT AND METHOD THEREOF

CROSS REFERENCE TO RELATED APPLICATION

This application claims the priority of Korean Patent Application No. 10-2007-0096622, filed on Sep. 21, 2007 in the KIPO (Korean Intellectual Property Office), the disclosure of which are incorporated herein in their entirety by reference. Further, this application is the National Phase application of International Application No. PCT/KR2008/000249, filed Jan. 15, 2008, which designates the United States and was published in English. Each of these applications is hereby incorporated by reference in their entirety into the present application.

TECHNICAL FIELD

The present invention relates to a system and a method for maintaining broadcasting chip information even when a mobile terminal device having the broadcasting chip information is replaced by a new mobile terminal, and more particularly to a system and a method for maintaining broadcasting chip information in a Universal Subscriber Identity Module (USIM) unlock environment, in which, when a mobile terminal device is replaced by a new mobile terminal, information that a new USIM has been mounted in the new mobile terminal is reported to a broadcast information management server of a broadcasting company, so that broadcasting chip information of the new mobile terminal can be easily replaced by broadcasting chip information of the existing mobile terminal.

BACKGROUND ART

A USIM refers to a single module, which includes a Subscriber Identity Module (SIM) card loaded with subscriber information and a Universal Integrated Circuit Card (UICC) are combined with each other, and has various functions, such as user authentication, global roaming, electronic commerce, etc. While a SIM stores personal information in order to provide various services, such as authentication, the charging of price, and security function, to subscribers of a mobile communication service, the USIM has both a subscriber authentication function one-step evolved from the subscriber authentication function of the SIM and the functions of a Universal IC Card (UICC), such as a transportation card, a credit card, etc.

Meanwhile, a USIM unlock environment signifies an environment where a USIM having information on a mobile communication subscriber can be moved between and used for multiple terminals. In the USIM unlock environment, by carrying the USIM, it is possible to use a voice mobile phone service, including international roaming, and an electronic commerce service, regardless of the types of terminals and communication providers.

Meanwhile, in association with Digital Multimedia Broadcasting (DMB), active research has recently been conducted in order to integrate a broadcast receiving function into a mobile communication terminal, so that an infrastructure has been recently constructed, in which it is possible to view a DMB broadcast upon receiving the DMB broadcast with the configuration of a terrestrial DMB receiving unit or a satellite DMB receiving unit in a mobile communication terminal.

In the case of viewing a DMB broadcast by using a mobile communication terminal, not only the viewer information but also information on the terminal, i.e. terminal information provided from a USIM card or a SIM card, is necessary. That is, since not only personal information on a viewer but also terminal information is required in order to view a DMB broadcast, each of recently produced terminals is equipped with a USIM card or a SIM card.

Also, a broadcast receiving chip is mounted within the terminal. The broadcast receiving chip may have various forms, such as a Subscriber Identity Module (SIM), a Surface Mounted Device (SMD), a Multiple Chip Package (MCP), and the like. The broadcasting chip as described above is usually a HardWare (H/W) module loaded with broadcast subscriber information, which has a stable structure. Differently from the USIM, the broadcasting chip is usually fixedly embedded in a terminal, and restricts broadcast reception by exchanging a broadcast recipient's personal information with a broadcasting system, e.g., a broadcast conditional access system.

In a broadcasting system, satellite DMB from among various DMB services restricts broadcast reception such that only paying subscribers can receive a relevant broadcast, like other types of satellite broadcasting services. Such a system as described above in which only subscribers can selectively receive broadcasts is called a Conditional Access System (CAS) and is applied to the satellite DMB.

Representative examples of receivers, to which the CAS is applied, include a set-top box for receiving pay channels of satellite broadcasting or cable broadcasting. Generally, a broadcast to which the CAS is applied, is sent in a state where images, sounds, and the like of the broadcast have been scrambled according to a prescribed algorithm or processed according to other schemes so that it is impossible to view the broadcast by itself. Then, the scrambled broadcast information can be restored to its original state by analyzing the relevant algorithm through the set-top box, thereby enabling normal viewing of the broadcast. Therefore, only subscribers are allowed to view the relevant broadcast. Hence, in the case of satellite DMB where subscriber-based broadcasting is considered, even a mobile communication terminal equipped with a DMB receiving unit for receiving a DMB broadcast requires a means for supporting the CAS.

The abovementioned CAS corresponds to such a system that a user's receiver determines if it is possible to receive a particular broadcast program. The CAS is intended to allow only those who pay a legitimate receiving fee to view programs, and viewing of digital broadcasting can become charged through the CAS. On this account, it can be said that the CAS is an element essential to commercialize digital broadcasting. The CAS having a conditional access function (or the reception restriction function) is configured to include scrambling technology of mixing voice data, image data, and the like for the protection from an unauthenticated reception, encryption technology of delivering data by using a control word key so as to view a broadcast only with a specific receiver, and the user service support function of providing users with various forms of services based on the scrambling technology and the encryption technology. A conventional CAS employs a fixed-type disc descrambler device in which a decoding algorithm and secret keys are stored, but recently, it is generalized to deliver, by a smart card loaded with unique personal information of a subscriber, a secret key to a user in consideration of the charging of price, convenience property, security, and others.

As illustrated in FIG. 1, the CAS as described above includes: an Entitlement Control Message (ECM) generator for generating an ECM upon receiving program information, package information, etc., from a TCS (i.e., a broadcast schedule generator); an Entitlement Management Message (EMM) generator for generating an EMM upon receiving subscriber information and purchase information from an SCIS (i.e., a subscriber management system); and a security/authentication server for carrying out encryption with the application of a reliable security algorithm so as to safely deliver a control word.

Also, the CAS is assigned a digital signature which authenticates a message, such as an ECM, an EMM, etc., as a legal message sent from a broadcasting center and can then confirm the transformation of a relevant message, and includes receiver CA SoftWare (S/W) equipped within a receiver, which takes charge of authentication and filtering in regard to a message, such as an ECM, an EMM and the like, and carries out a mutual authentication between a smart card and a receiver. In addition, the above smart card corresponds to a card having a built-in chip equipped with its own processor and memory, which is provided to a subscriber so as to view satellite broadcasting, and both physical and electrical characteristics and a transfer protocol of the smart card comply with a definition of ISO 7816-1, 2, and 3.

Therefore, the CAS receives an input ECM from a receiver, and then makes a comparison between conditional access properties (i.e., a viewing right, reception area restriction, reception age restriction, etc.) of the ECM and the contents of the smart card, thereby determining if a broadcast can be received. If it is determined that a broadcast can be received, the CAS generates a control word corresponding to a key capable of descrambling a scrambled broadcasting signal to provide the generated control word to the receiver, and performs a command delivered by the EMM, thereby modifying or producing information (i.e., subscriber information, purchase information, etc.) within the smart card.

Along with the SCIS, the CAS so configured as described above corresponds to a core system of a broadcasting system required for a pay digital satellite broadcasting service, enables each subscriber to be provided with desired services in an accurate and convenient manner, prevents illegal viewing for the sake of broadcasters, and provides various marketing data, such as each subscriber's viewing propensity and others, thereby providing a system which enables a viewer-oriented broadcasting service on the basis of the various marketing data.

However, the CAS as described above is used as a system for restricting broadcast reception. Therefore, in the case of DMB-receiving mobile terminals that have recently been widely used, replacement of a terminal device may restrict reception of broadcast programs, which causes inconvenience in the use of the mobile terminal. That is, since it is usual that a broadcasting chip is fixed to a terminal differently from a USIM, a broadcasting chip of the new terminal cannot be replaced by a broadcasting chip of an existing terminal even when the existing terminal is replaced by the new terminal and a USIM of the existing terminal is mounted in the new terminal. Then, the CAS cannot recognize correlation between recipient information and the new terminal, and cannot provide proper control to the pay digital satellite broadcasting service.

DISCLOSURE OF INVENTION

Technical Problem

Accordingly, the present invention has been made to solve the above-stated problems occurring in the prior art, and it is an object of the present invention to provide a system and a method for maintaining broadcasting chip information regardless of device replacement in a USIM unlock environment, in which information on movement of a USIM to a new terminal is reported to an information management server of a broadcasting company, and the user's broadcast-related information is moved from an existing terminal to the new terminal having the moved USIM on the basis of broadcasting chip information of the new terminal and broadcasting chip information of the existing terminal, so that Conditional Access (CA) information can be automatically changed in accordance with user's actual circumstances.

It is another object of the present invention to provide a system and a method for maintaining broadcasting chip information regardless of device replacement in a USIM unlock environment, in which an information management server of a broadcasting company changes the type of an existing terminal and transmits a CA message according to the change through a broadcasting network or a mobile communication network, so that it is possible to easily construct a system by means of a service employing the existing broadcasting infrastructure.

It is still another object of the present invention to provide a system and a method for maintaining broadcasting chip information regardless of device replacement in a USIM unlock environment, in which, when a USIM user replaces an existing terminal by a new terminal and terminates a broadcasting chip of the existing terminal, and a USIM card of another subscriber of the broadcasting service is mounted in the existing terminal, the two users' relevant broadcast-related information is maintained according to an existing scheme, so as to increase the convenience of each user.

Technical Solution

In accordance with a first aspect of the present invention for achieving the above objects, there is provided a system for maintaining broadcast information regardless of device replacement when a first Universal Subscriber Identity Module (USIM) card mounted in a first terminal having a first broadcasting chip is separated from the first terminal and is then mounted in a second terminal having a second broadcasting chip in a USIM unlock environment, the system including: a mobile communication information management server for managing unique information of a terminal and USIM-based subscriber information, and for determining and notifying device replacement when the unique information of the terminal is different from the subscriber information; a broadcast information management server for making a request of modification regarding broadcast information related to the subscriber information after the unique information of the terminal and the subscriber information are provided according to the notification procedure of the mobile communication information management server; and a Conditional Access System (CAS) for transmitting, to the second terminal, device change information necessary in order to change information on the second broadcasting chip of the second terminal to information on the first broadcasting chip of the first terminal corresponding to the subscriber information, in response to the request for modification of broadcast information by the broadcast information management server.

In accordance with a second aspect of the present invention for achieving the above objects, there is provided a method for maintaining broadcast information regardless of device replacement when a first USIM card mounted in a first terminal having a first broadcasting chip is separated from the first terminal and is then mounted in a second terminal having a second broadcasting chip in a USIM unlock environment, the method including the steps of: transmitting terminal information on the second terminal and subscriber information corresponding to the first USIM card to a mobile communication information management server; when the terminal information is different from terminal information corresponding to the subscriber information, determining that there has been device replacement, and then providing the terminal information and the subscriber information to a broadcast information management server, by the mobile communication information management server; transmitting a request for modification of broadcasting chip information from the mobile communication information management server to a Conditional Access System (CAS), and extracting, by the CAS, broadcast information on the first broadcasting chip based on the subscriber information in response to the request; generating EMM information based on the broadcast information on the first broadcasting chip, and providing the generated EMM information to the second terminal corresponding to the terminal information; and modifying the information on the second broadcasting chip of the second terminal to information on the first broadcasting chip.

In accordance with a third aspect of the present invention for achieving the above objects, there is provided a method for maintaining broadcast information regardless of device replacement when a first USIM card mounted in a first terminal having a first broadcasting chip is separated from the first terminal and is then mounted in a second terminal having a second broadcasting chip in a USIM unlock environment, the method including the steps of: receiving terminal information on the second terminal and subscriber information corresponding to the first USIM card from the second terminal; extracting broadcast information corresponding to the subscriber information from previously stored broadcast information on each subscriber; and generating EMM information based on the broadcast information, and transmitting the EMM information to the second terminal corresponding to the terminal information.

Advantageous Effects

In a system and a method for maintaining broadcasting chip information regardless of device replacement in a USIM unlock environment according to the present invention, if device replacement occurs in a terminal equipped with a broadcasting chip and having a built-in USIM card, relevant broadcast information is maintained by using a CAS, and accordingly, the same service as an existing service can be provided without performing a special information replacement task during broadcast reception.

BRIEF DESCRIPTION OF THE DRAWINGS

The above and other exemplary features, aspects, and advantages of the present invention will be more apparent from the following detailed description taken in conjunction with the accompanying drawings, in which:

FIG. 2 is a view illustrating the configuration of a system for maintaining broadcasting chip information regardless of device replacement in a USIM unlock environment according to the present invention;

FIG. 3 is a block diagram illustrating important functions of a Conditional Access System (CAS) according to the present invention; and FIG. 4 is a flowchart showing essential operations of the present invention.

BEST MODE FOR CARRYING OUT THE INVENTION

Figure 1:
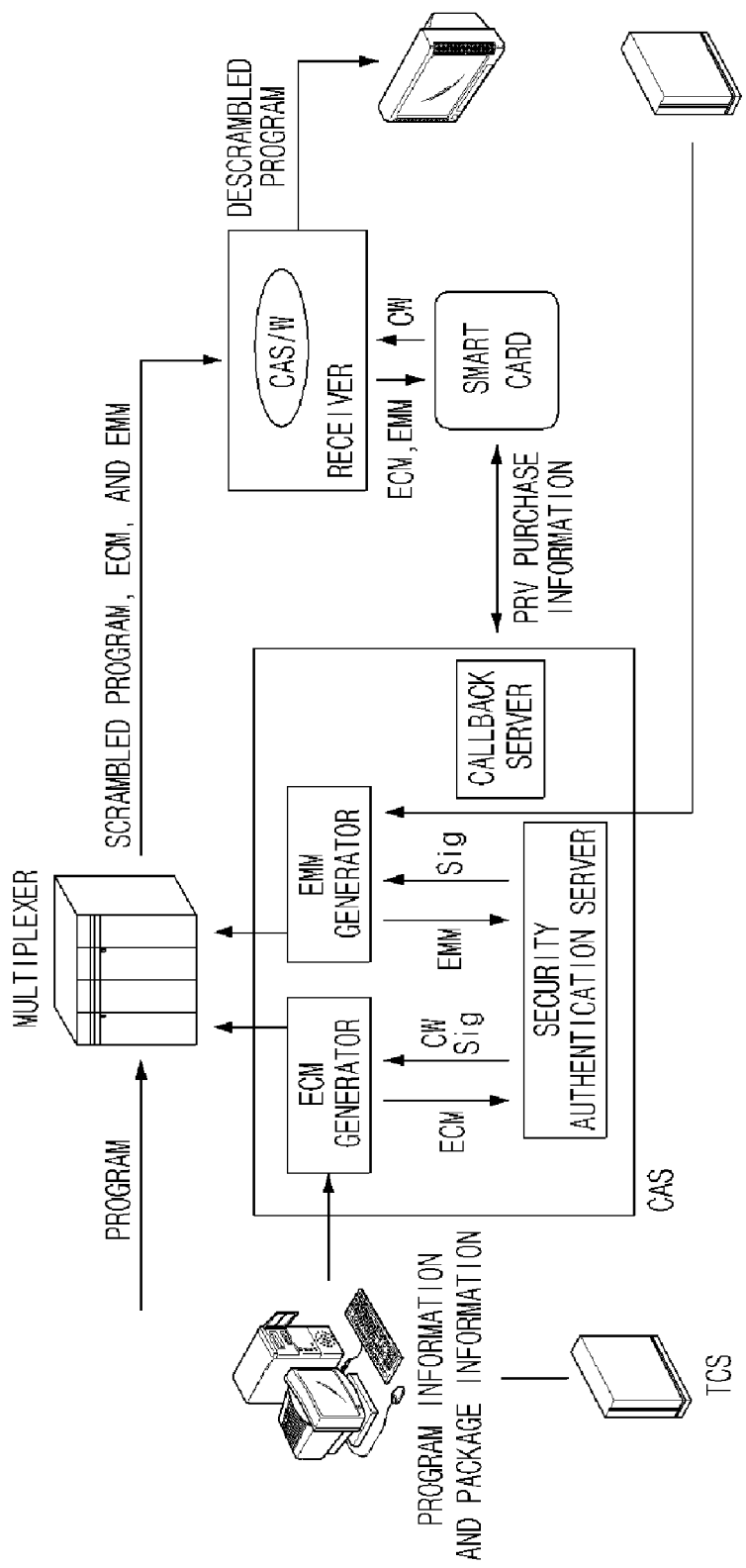
FIG. 1 is a view illustrating the configuration of a conventional Conditional Access System (CAS)

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear.

In embodiments of the present invention, a terminal_A is defined as an original terminal used by a user, and a terminal_B is defined as a new terminal by which the user replaces the original terminal. The terminal_A includes a broadcasting chip_A, and has a detachable USIM_A card. Also, the terminal_B includes a broadcasting chip_B, and has a detachable USIM_B card. Based on the structure as described above, two embodiments will be presented below for a case where a user replaces a terminal_A by a terminal_B.

According to the first embodiment of the present invention, when a terminal_A is replaced by a terminal_B and a USIM_A card originally mounted within the terminal_A is detached from the terminal_A and is then mounted in the terminal_B, information on a broadcasting chip_A equipped within the terminal_A is maintained while information on a broadcasting chip_B equipped within the terminal_B is replaced by information on the broadcasting chip_A.

According to the second embodiment of the present invention, when a terminal_A is replaced by a terminal_B and a USIM_A card originally mounted within the terminal_A is detached from the terminal_A and is then mounted in the terminal_B, information on a broadcasting chip_A equipped within the terminal_A is deleted or removed while information on a broadcasting chip_B equipped within the terminal_B is replaced by information on the broadcasting chip_A.

The first embodiment is based on a presumption that another USIM card is not mounted in the terminal_A. On the same principle, the first embodiment is based on a state in which the USIM_B card used by the terminal_B has been removed, i.e. in a state where the USIM_B card is not mounted in any other terminal. Hence, according to the first embodiment, if a separate USIM card is mounted in the terminal_A while subscriber lines in regard to the broadcasting chip_A and the broadcasting chip_B are being used in a duplicate manner, an existing subscriber line in regard to the broadcasting chip_A is canceled, or subscriber information on the broadcasting chip_A is deleted.

FIG. 2 is a view illustrating the configuration of a system for maintaining broadcasting chip information regardless of device replacement in a USIM unlock environment according to the present invention. FIG. 2 is based on a system for maintaining broadcast information in a case where a USIM_A card mounted in an existing terminal_A having a broadcasting chip_A is separated from the existing terminal_A and is then mounted in a terminal_B having a broadcasting chip_B.

As illustrated in FIG. 2, the system for maintaining broadcasting chip information includes: a mobile communication information management server 201 for managing subscriber information based on unique information of each terminal and USIM information on the relevant terminal, and for performing a notification procedure corresponding to device replacement by supposing that the device replacement occurs if unique information of a terminal and subscriber information are different from each other; a broadcast information management server 203 for making a request necessary to modify broadcast information on a relevant subscriber after the unique information of the terminal and the subscriber information are provided according to the notification procedure of the mobile communication information management server 201; and a Conditional Access System (CAS) 205 for controlling the transfer, to a terminal_B, of an Entitlement Management Message (EMM) necessary to modify broadcasting chip information from information on a broadcasting chip_A of an existing terminal_A corresponding to the subscriber information to information on a broadcasting chip_B of the terminal_B, by which a user replaces the user's existing terminal_A, in response to the request necessary to modify broadcast information (or the broadcast information modification request) of the broadcast information management server 203.

The CAS 205 employs either broadcasting network including a satellite network and a terrestrial network, or a Out-Of-Band (OOB) network so as to modify information on the broadcasting chip_B of the terminal_B. Also, a subscription message (i.e. an EMM) provided by the CAS 205 is required to modify broadcasting chip information with which a receiving terminal is loaded, and since a broadcast receiving terminal has already been loaded with an algorithm for modifying information, a detailed description of the algorithm for modifying information will be omitted.

Meanwhile, the CAS 205 can maintain a subscriber line of the existing terminal_A according to the first embodiment as described above, and can simultaneously provide a cancelation message (i.e. an EMM) necessary to cancel the subscription of the existing terminal_A besides the subscription message (i.e. the EMM) according to the second embodiment as described above.

FIG. 3 is a block diagram illustrating important functions of the CAS according to the present invention.

As illustrated in FIG. 3, the CAS includes: a database 301 for storing and managing broadcast information on each subscriber corresponding to a broadcasting chip; a communication unit 305 for performing communication with the broadcast information management server 203 on the basis of a set protocol and for transferring a message (i.e. an EMM) through a broadcasting network or a mobile communication network; a data analysis unit 307 for performing analysis on data provided by the broadcast information management server 203; a control unit 309 for extracting the subscriber information and the terminal information on a relevant subscriber on the basis of the analysis results of the data analysis unit 307, for receiving input broadcasting chip_A information on the relevant subscriber from the database on the basis of the subscriber information, and then providing a message generation command in regard to a message including the broadcasting chip_A information and the terminal information; and a message generation unit 311 for providing the communication unit 305 with a subscription message (i.e. an EMM) necessary to modify the broadcasting chip_B information of the terminal_B corresponding to the terminal information to the broadcasting chip_A information in response to the message generation command from the control unit 309.

Herein, the control unit 309 can additionally generate a message cancelation command necessary to delete the broadcasting chip_A information of the existing terminal_A, or necessary to cancel a subscription line regarding the broadcasting chip_A of the existing terminal_A, and in response to the additionally generated message cancelation command, the message generation unit 311 provides a cancelation message (i.e. an EMM) necessary to delete or terminate the broadcasting chip_A information of the existing terminal_A.

Hereinafter, a detailed description of an operation of the present invention will be made based on the accompanying drawings as follows.

FIG. 4 is a flowchart showing essential operations of the present invention. As illustrated in FIG. 4, in step S401, a user removes a USIM_A card of an existing terminal_A having a built-in broadcasting chip_A from the existing terminal_A, and mounts the removed USIM_A card in a terminal_B having a built-in broadcasting chip_B, by which the user replaces the existing terminal_A. Accordingly, the terminal_B has the built-in broadcasting chip_B, and is equipped with the USIM_A card. In step S403, after a prescribed time unit passes, or after the terminal_B is equipped with the USIM_A card, when a power source is initially applied to the terminal_B, the terminal_B transfers, to the mobile communication information management server 201, subscriber information stored in the USIM_A card, including unique information of the relevant terminal (e.g., identity number information thereof) according to a communication protocol.

The mobile communication information management server 201 detects a registration status regarding currently received unique information of the relevant terminal and subscriber information, and if the unique information of the relevant terminal and the subscriber information do not coincide with each other, the mobile communication information management server 201 senses the occurrence of device replacement. Accordingly, the mobile communication information management server 201 proceeds to step S405, where the mobile communication information management server 201 notifies the broadcast information management server 203 of the fact that device replacement regarding a subscriber occurs. At this time, the mobile communication information management server 201 transfers terminal information of the terminal_B and subscriber information corresponding to the USIM_A card to the broadcast information management server 203.

In step S407, the broadcast information management server 203 requests the CAS 205 to modify broadcast information in response to device replacement. Also, the broadcast information management server 203 provides the CAS 205 with the terminal information of the terminal_B and the subscriber information. Based on a preset protocol, the communication unit 305 receives communication data provided by the broadcast information management server 203. In step S409, the control unit 309 provides the data analysis unit 307 with the communication data received by the communication unit 305, and the data analysis unit 307 extracts terminal information and subscriber information from the currently received communication data.

Thereafter, the control unit 309 extracts broadcast information on each subscriber corresponding to a relevant subscriber from the database 301 on the basis of the extracted subscriber information. Herein, the extracted broadcast information corresponds to broadcast information, with which the broadcasting chip_A of the existing terminal_A is loaded, and the control unit 309 provides the message generation unit 311 with a command necessary to direct the generation of a subscription message (i.e. an EMM) including the relevant broadcast information.

In step S411, the message generation unit 311 generates a subscription message (i.e. an EMM) on the basis of the broadcast information and terminal information of the terminal_B in response to the direction command from the control unit 309, and in step S413, provides the subscription message (i.e. the EMM) to the communication unit 305. The communication unit 305 transfers the subscription message (i.e. the EMM) to the terminal_B through a broadcasting network or an Out-Of-Band (OOB) network 207.

After the terminal_B receives the subscription message (i.e. the EMM) transferred from the CAS 205, in step S415, the terminal_B updates the broadcast information included in the subscription message (i.e. the EMM) to the broadcasting chip_B equipped within the terminal_B. Hence, the user can be provided with a broadcasting service through the terminal loaded with the USIM_A card, by which the user has replaced the existing terminal.

Meanwhile, in step S413, the CAS 205 can delete the broadcasting chip_A information of the existing terminal_A, or can additionally send a cancelation message (i.e. an EMM) necessary to cancel a subscription line of the broadcasting chip_A. The deletion of the broadcasting chip_A information or the additional transmission of the cancelation message can be selectively applied depending on a service environment according to the present invention. Consequently, the existing terminal_A receives the cancelation message (i.e. an EMM) in step S415, and then cancels a line in relation to the broadcasting chip_A information.

The merits and effects of exemplary embodiments, as disclosed in the present invention, and as so configured to operate above, will be described below.

In a system and a method for maintaining broadcasting chip information regardless of device replacement in a USIM unlock environment according to the present invention, if device replacement occurs in a terminal equipped with a broadcasting chip and having a built-in USIM card, relevant broadcast information is maintained by using a CAS, and accordingly, the same service as an existing service can be provided without performing a special information replacement task during broadcast reception.

INDUSTRIAL APPLICABILITY

Consequently, even when an existing terminal is replaced by a new terminal, existing broadcast information is maintained through a mutual linkage between a mobile communication network and a broadcasting network system, thereby producing quality improvement in a communication service, which in turn increases value for industrial use.

While the invention has been shown and described with reference to exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

The invention claimed is:

1. A system for maintaining broadcast information regardless of device replacement when a first Universal Subscriber Identity Module (USIM) card mounted in a first terminal having a first broadcasting chip is separated from the first terminal and is then mounted in a second terminal having a second broadcasting chip in a USIM unlock environment, the system comprising:
    a mobile communication information management server for receiving unique information of the second terminal and USIM-based subscriber information corresponding to the first USIM card from the second terminal through a registration message, and for determining and notifying that there has been a device replacement when the unique information of the second terminal and the subscriber information are different from each other;
    a broadcast information management server for making a request for modification of broadcast information related to the subscriber information upon receipt of the unique information of the second terminal and the subscriber information from the mobile communication information management server; and
    a Conditional Access System (CAS) for transmitting, in response to the request for modification of broadcast information by the broadcast information management server,
        to the second terminal, an Entitlement Management Message (EMM) with device change information that includes broadcast information to update information on the second broadcasting chip of the second terminal to information on the first broadcasting chip of the first terminal corresponding to the subscriber information, and
        to the first terminal, an EMM that includes information necessary to delete or terminate subscriber information on the first broadcasting chip in response to a different USIM card mounted in the first terminal.

2. The system as claimed in claim 1, wherein the CAS employs either a broadcasting network or an Out-Of-Band (OOB) network so as to modify the information on the second broadcasting chip of the second terminal.

3. The system as claimed in claim 1, wherein the CAS comprises:
    a database for storing and managing the broadcast information on each subscriber;
    a communication unit for communicating with the broadcast information management server and transmitting the device change information to the second terminal;
    a data analysis unit for analyzing both the unique information of the second terminal and the subscriber information provided by the broadcast information management server;
    a control unit for extracting the subscriber information and the unique information of the second terminal based on an analysis result of the data analysis unit, extracting broadcast information on of the first broadcasting chip corresponding to the subscriber information from the database, and then providing a message generation command based on the extracted broadcast information and the extracted unique information of the second terminal; and
    a message generation unit for generating the device change information in response to the message generation command from the control unit, and then providing the generated device change information to the communication unit for transmission to the second terminal.

4. A method of maintaining broadcast information regardless of device replacement when a first USIM card mounted in a first terminal having a first broadcasting chip is separated from the first terminal and is then mounted in a second terminal having a second broadcasting chip in a USIM unlock environment, the method comprising:
    receiving terminal information on the second terminal and subscriber information corresponding to the first USIM card from the second terminal through a registration message, by a mobile communication information management server;
    when the terminal information of the second terminal is different from terminal information corresponding to the subscriber information, determining that there has been a device replacement, and then providing the terminal information of the second terminal and the subscriber information to a broadcast information management server, by the mobile communication information management server;

transmitting a request for modification of broadcasting chip information from the mobile communication information management server to a Conditional Access System (CAS), and extracting, by the CAS, broadcast information on the first broadcasting chip based on the subscriber information in response to the request;

generating, by the CAS, an Entitlement Management Message (EMM) based on the extracted broadcast information on the first broadcasting chip, and providing, by the CAS, the generated EMM to the second terminal corresponding to the terminal information of the second terminal;

updating, by the second terminal, the broadcast information of the second broadcasting chip according to the EMM; and transmitting, by the CAS to the first terminal, an EMM that includes information necessary to delete or terminate subscriber information on the first broadcasting chip, in response to a different USIM card mounted in the first terminal.

* * * * *